United States Patent [19]

Koce

[11] Patent Number: 5,228,307
[45] Date of Patent: Jul. 20, 1993

[54] MULTITEMPERATURE RESPONSIVE COOLANT COIL FAN CONTROL AND METHOD

[75] Inventor: Joseph J. Koce, Oak Forest, Ill.

[73] Assignee: Kobatecon Group, Inc., Oak Forest, Ill.

[21] Appl. No.: 918,283

[22] Filed: Jul. 22, 1992

Related U.S. Application Data

[63] Continuation of Ser. No. 661,878, Feb. 27, 1991, abandoned.

[51] Int. Cl.⁵ .............................................. F25B 41/00
[52] U.S. Cl. ........................................ 62/186; 62/158; 62/182; 236/DIG. 9
[58] Field of Search ................ 62/180, 182, 186, 231, 62/158, 157; 236/11, 9 A, DIG. 9; 165/39, 40

[56] References Cited

U.S. PATENT DOCUMENTS

| | | | |
|---|---|---|---|
| 2,236,914 | 4/1941 | Nessell | 62/186 X |
| 4,094,166 | 6/1978 | Jerles | 62/180 X |
| 4,362,026 | 12/1982 | Miller | 62/180 X |
| 4,682,473 | 7/1987 | Rogers, III | 62/231 X |
| 4,773,587 | 9/1988 | Lipman | 236/DIG. 9 |

*Primary Examiner*—Harry B. Tanner
*Attorney, Agent, or Firm*—Potthast & Ring

[57] ABSTRACT

A cooling system (10) with a control temperature sensor (24) for sensing the temperature of a coolant coil (14) for control of a coolant coil fan (18) in cooperation with ambient temperature sensed by a thermostat (30) to obtain optimum utilization of residual cooling power of the coolant coil (14) after the condenser (28) has been deactivated and to protect against overcooling and consequent icing of the coolant coil (14) in the event of inadvertent failure of the thermostat (30) to turn off the condenser (28).

20 Claims, 1 Drawing Sheet

MULTITEMPERATURE RESPONSIVE COOLANT COIL FAN CONTROL AND METHOD

This application is a continuation of application Ser. No. 07/661,878, filed Feb. 27, 1991, abandoned.

This invention relates to a cooling system control and, more particularly, to a cooling system with a multitemperature responsive control for a coolant coil fan.

In known cooling systems a thermostat responds to ambient temperature to control the operation of a condenser and a coolant coil fan. When the condenser is activated, it causes reduction in the temperature of a coolant coil which absorbs heat from air passed over the coolant coil by a coolant coil fan before being injected into the ambient space being cooled. When the ambient temperature increases over a preselected ambient set temperature, a condenser switch activates the condenser, and another fan switch is actuated to activate the coolant coil fan. Conversely, when the ambient temperature, as detected by an ambient temperature sensor of the thermostat, drops beneath a preselected set ambient temperature, the thermostat condenser switch deactivates the condenser. Once the condenser is deactivated, the coolant coil gradually begins to warm, but it retains residual cooling power for some time until it becomes nearly as warm as the ambient temperature.

Benefit from the residual cooling power and optimal efficiency is only obtained if the coolant coil fan continues to blow air over the coolant coil after the condenser has been deactivated. In older systems, the coolant coil fan is deactivated simultaneously with deactivation of the condenser which results in complete waste of the residual coolant power. This problem is partly overcome in a number of systems which keep the coolant coil fan operating after termination of operation of the condenser to obtain the benefit of the residual cooling power. These systems sense when the condenser is turned off and measure a preselected time period before turning off the coolant coil fan. In U.S. Pat. No. 2,953,908 issued Sep. 27, 1960 to Petrone et al. a system is shown in which the blower fan is normally in an on condition, and a time delay switch shuts down the fan after the condenser has previously been shut down. In U.S. Pat. No. 4,094,166 issued Jun. 13, 1978 to Jerles a temperature sensor overrides a timer to activate the condenser when the coolant coil temperature exceeds a level where efficient cooling can occur, while the evaporator fan is caused to operate continuously unless shut off with the condenser by the ambient thermostat or a timer. In each of U.S. Pat. Nos. 4,237,966 issued Dec. 9, 1980 to Tomlinson; 4,369,916 issued Jan. 25, 1983 to Abbey and 4,941,325 issued Jul. 17, 1990 to Nuding, a coolant coil fan is kept on for a preselected time period after a condenser is shut down. Similarly, in U.S. Pat. No. 4,423,765 issued Jan. 3, 1984 to Hildebrand a programmable timer controls both a heating and a cooling system.

In heating systems, as opposed to cooling systems, it is known to use a control temperature sensor located in proximity to the heat source to control the fan. However, in such heat systems, the fan is controlled solely by the control temperature sensor independently of, and not in cooperation with, the ambient thermostat. Consequently, not only is the fan turned off regardless of the ambient temperature, disadvantageously, it is also turned on regardless of the ambient temperature and often after the thermostat has called for heat.

The disadvantage with known cooling systems which employ preselected fixed time delay periods is that different conditions result in different time periods needed for optimal utilization of the residual cooling power of the coils to vary, while in the known systems, while the time periods for continued operation of the fan after condenser activation are fixed and do not vary. It is thus not possible to obtain optimal residual cooling power usage and maximum efficiency in the known systems.

Another problem with these cooling systems which employ timers is that the timers cause termination of fan operation at the end of a preselected time period regardless of whether the condenser is shut off. Thus, even if the thermostat for any reason fails to successfully terminate power to the condenser when the ambient set temperature is reached (due to a short in the condenser control switch, for instance), the operation of the fan will still be terminated at the end of the preselected time period. In such event, the coolant coil can become overcooled and consequently become ice covered and place an overload on, and cause possible damage to, the condenser. In addition, subsequent melting of ice from the condenser can cause water problems. In such a case, because operation of the fan is terminated at the end of the time period, the ambient temperature is not lowered by continuous operation of the condenser and, thus, the failure of the condenser to turn off is not readily detectable. Accordingly, faulty operation and consequent inefficiency and potential safety risk, equipment damage and water damage is more likely to continue indefinitely before detection.

SUMMARY OF THE INVENTION

It is therefore an object of the invention to provide apparatus and methods for controlling the operation of a coolant coil fan of a cooling system which optimumizes utilization of residual cooling capability of the coolant coil after deactivation of the condenser and protects against inadvertent operation of the condenser without concurrent operation of the coolant coil fan.

This objective is achieved in part through provision in an air cooling system having a coolant coil and a coolant coil fan, with a multitemperature responsive control system comprising means for sensing the ambient temperature, means for sensing a nonambient control temperature related to the temperature of the coolant coil and means responsive to both the ambient temperature sensing means and the control temperature sensing means for controlling the coolant coil fan. Preferably, the air cooling system includes means responsive to the control temperature sensing means for deactivating the coolant coil fan and means responsive to the ambient temperature sensing means for activating the coolant coil fan.

The objective is also achieved through the provision of a coolant coil temperature sensing override control unit for an air cooling system having an ambient thermostat for control of a coolant coil fan with means for sensing the temperature of the coolant coil and means responsive to the coolant coil temperature sensing means for disabling the ambient thermostat from deactivating the coolant coil fan.

The object of the invention is also achieved by providing a method of controlling a coolant coil fan of a cooling system having an ambient temperature sensing thermostat and a compressor comprising the steps of (1) sensing a nonambient control temperature related to the temperature of the cooling coil at a location apart from the ambient temperature thermostat and (2) disabling the ambient thermostat from deactivating the coolant coil fan in response to the ambient temperature decreasing below a preselected ambient set temperature until the nonambient control temperature increases above a preselected control set temperature.

BRIEF DESCRIPTION OF THE DRAWINGS

The foregoing advantages, features and objects of the invention will be described in more detail and others will be made apparent from the detailed description of the preferred embodiment given with reference to the several views of the drawing, in which.

DETAILED DESCRIPTION

Figure 1:
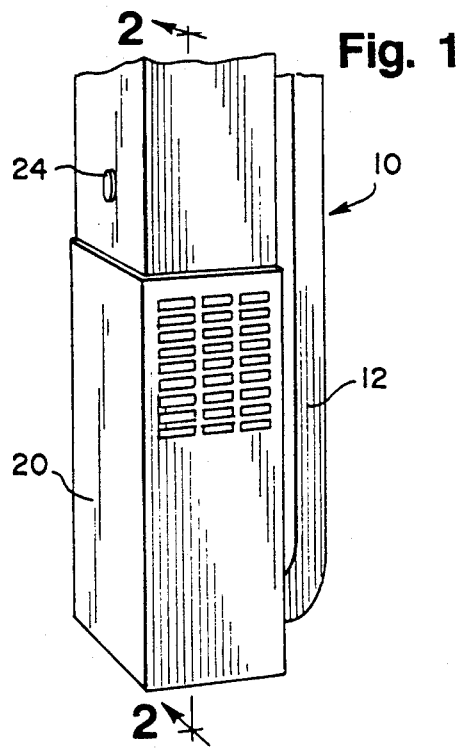
FIG. 1 is a perspective view of a preferred embodiment coolant system of the present invention.
Figure 2:
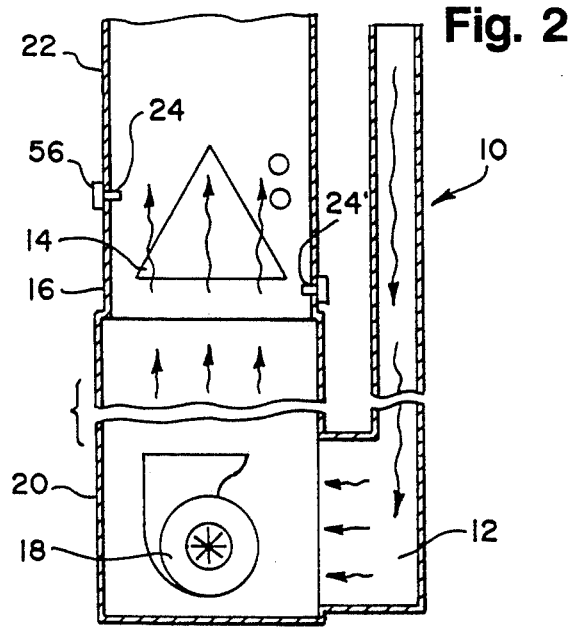
FIG. 2 is a sectional side view of the coolant system of FIG. 1.

Referring to FIGS. 1 and 2, the preferred embodiment of the coolant system 10 of the present connection includes a return 12, a coolant coil 14 within a plenum conduit 16 and a blower, evaporator fan, or coolant coil fan, 18 within a fan housing 20 interconnecting the plenum conduit 16 with the cool air return 12. The coolant coil fan 18 passes air from the return 12 over the coolant coil 14 which cools and dehumidifies the air before it passes through the cool air outlet supply conduit 22 to the area being cooled. As will be explained with reference to FIG. 3, a temperature sensor 24, FIGS. 1 and 2, is preferably inserted adjacent the coolant coil 14. As seen in FIG. 2, sensor 24 is shown adjacent and downstream of coil 14 and an alternative upstream position of sensor 24' is shown upstream in broken lines as sensor 24'. Within the interior of the plenum conduit 16 or conduit 22 which can include being up or downstream from coolant coil 14, to sense a control temperature related to the temperature of the coolant coil 14. The control temperature is used to control a control temperature responsive override switch 56 within a housing. The housing is mounted to the outside of the conduit 22 to facilitate connection of the switch 56 with a thermostat 30, a coolant coil relay 49 and a condenser 28 shown in FIG. 3. The control temperature is not used alone but instead is used in conjunction with the ambient temperature of the space being cooled, as sensed by a temperature sensor 29 of a thermostat 30. Preferably, both the control temperature sensor 24 and the thermostat sensor 30 are bimetallic elements, although thermocouples, responsive electronic switches or other like devices could also be employed.

Figure 3:
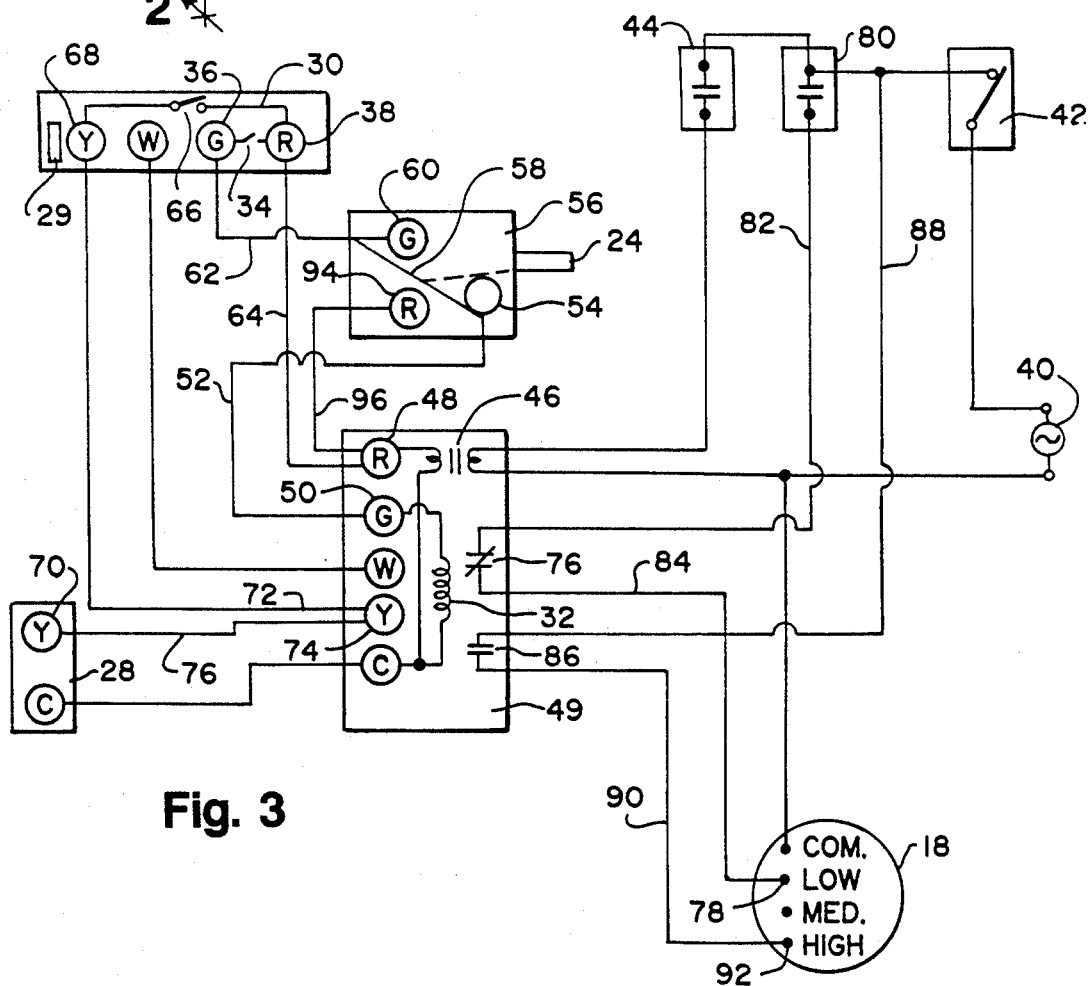
FIG. 3 is a schematic wiring diagram of a preferred embodiment of the multitemperature fan control used with the coolant system of FIGS. 1 and 2.

Referring to FIG. 3, when the thermostat 30 senses an ambient temperature which is greater than a preselected set temperature, such as 72°, it energizes a fan relay coil 32 by closing a switch 34 between thermostat terminals 36 and 38. This causes AC power from a 120 VAC power source 40 to be applied through an AC power switch 42, a limit switch 44, and a step down transformer 46 to a fan coil relay terminal 48 of a fan coil relay 49. Power is applied to coil terminal 50 via a lead 52, common terminal 54 of a control temperature responsive override switch 56, switch armature 58, post terminal 60 of override switch 56, a lead 62, thermostat terminal 36, thermostat switch 34, thermostat terminal 38 and a lead 64 connected to relay coil terminal 48.

Concurrently with closure of switch 34, a thermostat switch 66 connects the AC power at thermostat terminal 38 to a thermostat terminal 68 from where it is applied to a terminal 70 of the compressor 28 via lines 72, a fan relay terminal 74 and a line 76 to activate the condenser.

When the relay coil 32 is energized, a normally closed switch 76 normally interconnecting a low speed terminal 78 of the coolant coil fan 18 with AC power source 40 is opened. When relay switch 76 is normally closed, AC power from AC power switch 42 and AC power source 40 is passed through a manual fan control switch 80, a lead 82, switch 76 and a lead 84 to low speed terminal 78 to cause the fan 18 to operate at a low speed.

When switch 76 opens, low speed operation is terminated and, instead, a normally open switch 86 closes to apply power from AC power source 40, AC power switch 42 and leads 88 and 90 to a high speed terminal 92 to operate fan 18 at high speed.

At temperatures above a preselected control set temperature, the temperature responsive override switch 56 is in the nonoverride position, as shown in FIG. 3. However, after the condenser has been energized sufficiently long, the temperature sensed by the control temperature responsive override switch 56 decreases to the preselected control set temperature, such as 65° F. This causes the override switch 56 to automatically switch to an override position with switch armature 58 in contact with an override post terminal 94.

With override switch 56 in the override position, AC power at coil relay terminal 48 is applied to fan coil terminal 50 via a lead 96, post terminal 94, armature 58, common terminal 54 and a lead 52. Concurrently, power to coil fan relay terminal 50 otherwise received via thermostat override switch 56, lead 62 and terminal 60 is interrupted by movement of switch armature 58 to the override position. Consequently, termination of AC power to fan relay terminal 50 to energize the fan 18 is determined solely by operation of override switch 56 once the control temperature does achieve the preselected control set temperature.

Should the thermostat switch 34 open when the override switch 56 is in the override position, as shown, switch 34 will have no effect on continuing fan operation. Conversely, should switch 36 become shorted for any reason such that power continues to be applied to the condenser 28 after the ambient temperature has dropped below the ambient set temperature and switch 34 is opened, the relay switch 34 will continue to be energized, and the coolant coil fan 16 will continue to operate to prevent icing of the coil and resultant damage to the condenser 28.

After the set ambient set temperature is reached, if there is no failure of switch 36, the condenser 28 will be disconnected and the fan switch 34 will be reopened. The fan 18 will continue to operate because of the override switch 56, and when the control temperature reaches the control set temperature and the override switch 56 returns to the nonoverride position 60, switch 34 will have already been opened by the decrease in ambient temperature, such that the fan 26 will turn off and not be held on by the thermostat 30.

Thus, it is seen that switch 56 responds to the control temperature to actuate the coolant coil fan 18 while the ambient thermostat switch 34 functions to activate the coolant coil fan 18. In effect, switch 56 disables the thermostat switch 34 from deactuating the fan 18 until the control temperature exceeds a preselected control set temperature indicative of the condenser 28, in fact, having been deactivated.

Thus, a method is provided for controlling the coolant coil fan 18 of the cooling system 10 comprising the steps of (1) sensing the nonambient control temperature with sensor 24 and (2) disabling the switch 34 of ambient thermostat 30 from deactivating the coolant coil fan 18 in response to the ambient temperature. Power is applied to the coolant coil fan 18 independently of the thermostat 30 when the switch 56 switches to the override state in response to the nonambient control temperature decreasing below the preselected control set temperature. Later, the ambient thermostat 56 is enabled to remove power from the coolant coil fan 16 when the switch 56 switches to the nonoverride position in response to the control temperature increasing above the preselected control set temperature. Should the condenser now shut off when commanded by the thermostat 30, the control temperature will not rise above the control set temperature, and thus the fan 18 will continue to operate to prevent damage to the condenser 28.

While a detailed description of the preferred embodiment of the invention has been given, it should be appreciated that many variations can be made thereto without departing from the scope of the invention as set forth in the appended claims. For instance, although bimetallic temperature sensors are preferred, other types of temperature sensors and related temperature sensor responsive switches could be successfully employed.

I claim:

1. In an air cooling system having a coolant coil and a coolant coil fan, the improvement being a multitemperature responsive control system, comprising:
    means for sensing the ambient temperature;
    means for sensing a nonambient control temperature related to the temperature of the coolant coil; and
    means responsive to both the ambient temperature sensing means and the control temperature sensing means for controlling the coolant coil fan including means for activating to the nonambient control temperature sensing means for activating the coolant coil fan independently of the ambient temperature sensing means.

2. The air cooling system of claim 1 in which said coolant coil fan controlling means includes
    means responsive to the control temperature sensing means for deactivating the coolant coil fan, and
    means responsive to the ambient temperature sensing means for activating the coolant coil fan.

3. The air cooling system of claim 2 in which
    the responsive means to the ambient temperature sensing means for activating the coolant coil fan includes a thermostat switch of an ambient thermostat responsive to said ambient temperature sensing means,
    the responsive means to the control temperature sensing means for deactivating the coolant coil fan includes an override switch responsive to the control temperature, and
    said coolant coil fan controlling means also includes means for interconnecting said switches between a means of electrical power and the coolant coil fan.

4. The air cooling system of claim 3 in which said override switch has an override pole and an nonoverride pole responsively associated with an override state in which power need be applied only through the override switch alone to activate the coolant coil fan and a nonoverride position in which power must be applied through both the thermostat switch and the override switch to actuate the coolant coil fan.

5. The air cooling system of claim 2 in which said means responsive to the control temperature sensing means for deactivating the coolant coil fan includes
    means for applying power to the coolant coil fan independently of the responsive means for the ambient temperature sensing means for activating the coolant coil fan in response to the control temperature decreasing below a preselected temperature, and
    means for applying power to the coolant coil fan through the responsive means to the ambient temperature sensing means for activating the coolant coil fan in response to the control temperature increasing above a preselected temperature.

6. The air cooling system of claim 2 in which said responsive means to the ambient temperature sensing means for activating the coolant coil fan includes
    means for applying power to the coolant coil fan when the ambient temperature exceeds a preselected ambient set temperature, and
    means for removing power to the coolant coil fan when the ambient temperature decreases below a preselected ambient temperature and the control temperature increases above a preselected control set temperature.

7. The air cooling system of claim 2 in which said deactivating means includes means for overriding the removal of power from the coolant coil fan by the activating means until the control temperature has exceeded a preselected control set temperature.

8. The air cooling system of claim 1 in which said control temperature sensor detects temperature at a location adjacent the coolant coil.

9. The air cooling system of claim 8 in which said control temperature sensor is a bimetallic switch with two poles respectively associated with an override state and a nonoverride state.

10. The air cooling system of claim 8 in which the control temperature sensor detects temperature upstream of the coolant coil.

11. A coolant temperature responsive override control unit for an air cooling system having an ambient thermostat for control of a condenser and of a coolant coil fan, comprising:
    means for sensing the temperature of the coolant coil;
    means responsive to the coolant coil sensing means for activating the coolant coil fan independently of the ambient thermostat;
    an ambient thermostat for activating the condenser and the coolant coil fan independently of the coolant coil temperature sensing means; and
    means responsive to the coolant coil temperature sensing means for disabling the ambient thermostat from deactivating the coolant coil fan after the ambient thermostat has activated the coolant coil fan.

12. The override control unit of claim 11 in which said disabling means includes means for applying power to the coolant coil fan independently of the thermostat.

13. The override control unit of claim 12 in which said disabling means is a switch with a housing mountable to a conduit of the cooling system with the temperature sensing means mounted to said housing and extending therefrom for mounting within the conduit.

14. The override control of claim 13 in which said temperature sensing means comprises a bimetal element responsive to temperature changes for mechanically activating the switch between an override position in which power is independently applied to the coolant coil fan and a nonoverride position.

15. A method of controlling a coolant coil fan of a cooling system with an ambient temperature sensing thermostat and a compressor, comprising the steps of:
sensing a nonambient control temperature related to the temperature of the coolant coil below a preselect set temperature at a location apart from the ambient temperature thermostat; and
activating the coolant coil fan independently of the ambient temperature sensing thermostat in response to the nonambient control temperature decreasing below the preselected nonambient set temperature until the nonambient control temperature increases above the preselected control set temperature.

16. The method of claim 15 includes the step of applying power to the coolant coil fan independently of the thermostat in response to the nonambient control temperature decreasing below a preselected control set temperature.

17. The method of claim 16 which includes the step of enabling the ambient thermostat to remove power from the coolant coil fan in response to the control temperature increasing above a preselected control set temperature.

18. The method of claim 15 including the step of removing power from the coolant coil fan in response to the control temperature moving above a preselected control set temperature.

19. The method of claim 15 including the steps of
mounting a temperature sensing means at a location to sense the temperature within a conduit of the system adjacent the coolant coil, and
connecting the temperature sensing means to an override switch located without the conduit for connection between the thermostat switch and the coolant coil fan.

20. The method of claim 15 including the step of initiating the reapplication of power to the coolant fan by the ambient thermostat in response to the control temperature exceeding a preselected control set temperature.

* * * * *

UNITED STATES PATENT AND TRADEMARK OFFICE
CERTIFICATE OF CORRECTION

PATENT NO. : 5,228,307
DATED : July 20, 1993
INVENTOR(S) : Joseph J. Koce It is certified that error appears in the above-identified patent and that said Letters Patent is hereby corrected as shown below:

Col. 3, line 35, after "coil 14." delete "As seen in Fig. 2, sensor 24 is shown adjacent and downstream of coil 14 and an alternative upstream position of sensor 24' is shown upstream in broken lines as sensor 24'."
Col. 3, line 35, after "coil 14" delete "."
Col. 3, line 38, change "Within" to --within--
Col. 3, line 42, after "coil 14." insert -- As seen in Fig.2, sensor 24 is shown adjacent and downstream of coil 14 and an alternative upstream position of sensor 24' is shown upstream in broken lines as sensor 24'. --

Col. 5, line 41, after "means", delete "for activating" and insert -- responsive --
Col. 5, line 66, after "pole", delete "responsively" and insert -- respectively --

Signed and Sealed this

Fifteenth Day of March, 1994

*Attest:*

BRUCE LEHMAN

*Attesting Officer*     *Commissioner of Patents and Trademarks*